Aug. 9, 1955          E. F. BRILL          2,715,190

DUAL FLOW DIRECT CURRENT LINEAR ELECTROMAGNETIC PUMP

Filed Nov. 24, 1953

Inventor
Edward F. Brill
by J. Lloyd La Fave
Attorney

2,715,190

DUAL FLOW DIRECT CURRENT LINEAR ELECTROMAGNETIC PUMP

Edward F. Brill, Brookfield, Wis., assignor to Allis-Chalmers Manufacturing Company, Milwaukee, Wis.

Application November 24, 1953, Serial No. 393,985

9 Claims. (Cl. 310—11)

---

This invention relates to a dynamoelectric machine having two or more conduits containing electrically conductive fluid of separate fluid flow systems. More particularly, the fluid in one conduit serves as the armature portion of the dynamoelectric machine acting as a direct current linear electromagnetic generator and the fluid in another conduit serves as the armature portion of the dynamoelectric machine acting as a direct current linear electromagnetic pump.

Dynamoelectric machines operable as direct current linear electromagnetic generators or electromagnetic pumps heretofore have been proposed as separate independent machines. The dynamoelectric machine, according to the present invention, comprises a generator and a pump constructed of common elements in a unitary structure. The conductors providing current compensation and series excitation are common to both generator and pump whose armatures are connected in series. The fluid flowing in the generator conduit causes flow of fluid in a pump conduit. The relative direction of fluid flow in the generator and pump conduits is determined by the relative directions of the armature current through the fluids.

The pumping effected by the dynamoelectric machine may be regulated by varying the flow of fluid through the generator conduit. This arrangement permits the isolation of a fluid flow system. It permits pumping fluid in isolated systems by means of another fluid flow system coupled thereto through the generator and motor action of the direct current linear dynamoelectric machine. The dynamoelectric machine may be constructed for very high temperature operation and therefore may be used as a pump for a high temperature electrically conductive fluid system and simultaneously as a heat exchanger therefor. The dynamoelectric machine may be used to isolate and operate other closed fluid systems such as a fluid system which is dangerously radioactive or highly corrosive.

It is therefore an object of the present invention to provide a linear direct current dynamoelectric machine having a plurality of liquid armatures with fluid flow through one armature generating electric current therein which causes fluid to flow through another armature.

Another object of the invention is to provide a linear dynamoelectric machine having two or more conduits containing electrically conductive fluid of separate hydraulic systems with fluid flow in one conduit causing fluid flow in another conduit.

Another object of the invention is to provide a linear direct current dynamoelectric machine electromagnetically associated with two or more independent fluid flow circuits with fluid flow in one circuit causing fluid flow in another circuit.

Another object of the invention is to provide a direct current linear electromagnetic generator in combination with a linear direct current electromagnetic pump constructed and arranged in a unitary structure having excitation and compensation conductors common to both generator and pump.

Another object of the invention is to provide a linear direct current dynamoelectric machine having two conduits containing electrically conductive fluid of separate fluid flow circuits with flow of fluid in one conduit causing flow of fluid in another conduit and with the conduits arranged in heat exchange relation with each other.

Other objects and advantages will be apparent to one skilled in the art upon reading the following description with the accompanying drawing, in which.

Figure 1:
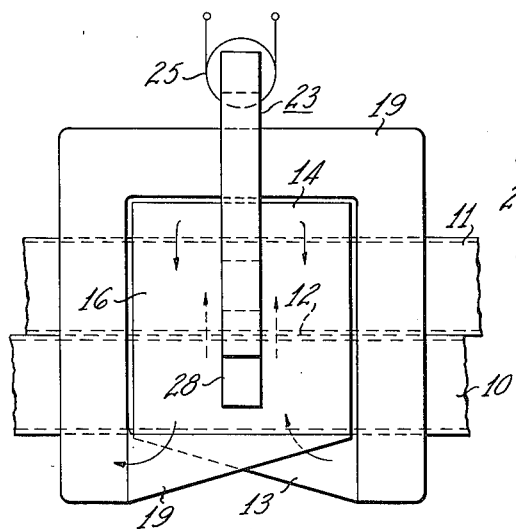
Fig. 1 is a plan view of a direct current linear dynamoelectric machine embodying the present invention.

The drawing shows a linear direct current dynamoelectric machine having a plurality of conduits for containing electrically conductive fluid of a plurality of separate fluid flow circuits. Fluid in conduits 10 and 11 serve as liquid armatures for the machine. Electric current is generated in moving armature fluid of conduit 10 and this current is supplied to the armature fluid of conduit 11. Series excitation and current compensation are provided which are common to both armatures. The dynamoelectric machine therefore operates simultaneously as electromagnetic generator and electromagnetic pump so that fluid moving through conduit 10 causes pumping of fluid in conduit 11.

Conduits 10 and 11 are disposed side by side and are joined by an electrode 12 within the throat or armature portion of the machine. Electrode 12 may be defined by a common wall for the adjacent conduits or as shown by adjacent walls joined by welding. An electrode 13 is suitably secured to conduit 10, and an electrode conductor 14 is suitably secured to conduit 11. The electrodes 12, 13, 14 are disposed to pass armature current in the same direction through the fluids of both conduits. The conduits are preferably of high ohmic resistance material such as stainless steel, so that current flow between electrodes is primarily through the fluid which has a relatively low ohmic resistance.

Compensation for armature reaction is provided by conductor 16 disposed above conduits 10, 11 and by conductor 17 disposed below the conduits. Compensation conductors 16 and 17 are connected to electrode 14 for conducting armature current in parallel paths above and below the conduits in a direction opposite its direction through the armatures.

Series excitation is provided by a conductor turn adjacent the armatures. Such turn is effected by a conductor 19 arranged in a loop surrounding compensating conductor 16 above the conduits and by a conductor 20 arranged in a loop surrounding conductor 17 below the conduits. Conductor 19 has one end connected to electrode 13 and its other end connected to compensation conductor 16 on the same side of the conduits. Conductor 20 has one end connected to electrode 13 and its other end connected to compensation conductor 17 on the same side of the conduits.

Conductor 19 is thus connected in series with compensation conductor 16 and the armatures. Conductor 20 is connected in series with compensation conductor 17 and the armatures. Conductors 19 and 20 thus provide parallel paths for the armature current in excitation loops above and below the conduits. This arrangement effects a series conductor turn providing a magnetic field through both armatures with lines of flux substantially normal to the conduits and to the armature current and normal to the flow of the armature fluids. The conductor turn effected is in the plane of symmetry of the conduits.

The series excited and compensated dynamoelectric machine thus far described is a closed circuit electromagnetic device without external electrical connection, and without an iron core. Means applying an initial magnetic field for starting generator action comprises removable electromagnet 23 having a C-shaped core 24 and a coil 25 disposed thereon for exciting the core when energized from a source of direct current, not shown. The core 24 may be made in two sections having ends 26, 27 abutting each other and hinged together to aid in placing in position or removing from the machine. Pole pieces 28, 29 of the electromagnet are disposed above and below, respectively, of the armature portion of at least conduit 10. Pole pieces may extend as shown over the armature portions of both conduits. Pole pieces in the position shown are encircled by the loops formed by conductors 19 and 20, respectively.

Figure 2:
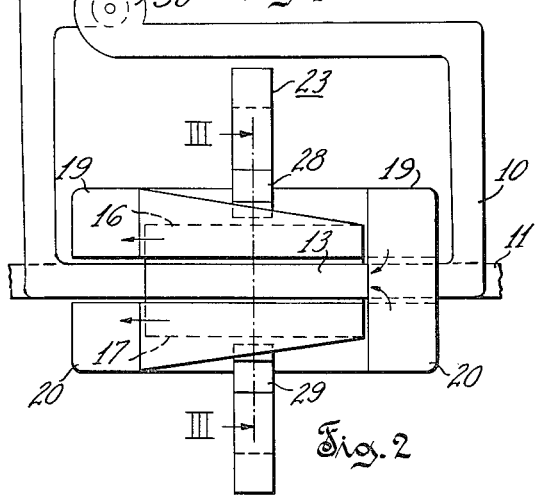
Fig. 2 is a view in elevation of the machine shown in Fig. 1.

In operation, fluid is forced in one direction through conduit 10 by suitable known means such as by centrifugal pump 30 shown in Fig. 2. This moving fluid cuts lines of flux produced by energization of electromagnet 23. As a result, electric current is generated in the moving fluid. This current circulates in the closed series circuit as indicated by arrows in Figs. 1 to 3, energizing the conductor turn effected by conductors 19 and 20 and supplying current to the armature fluid in conduit 11. The energized conductor turn produces a magnetic field through the armature fluids of conduits 10 and 11 which lie in parallel paths in the magnetic circuit.

The armature current in the fluid of conduit 11 reacts with the magnetic field therein to force the fluid in conduit 11 to flow in a direction opposite the direction of flow of the fluid in conduit 10.

Thus, moving armature fluid in conduit 10, compensation conductors 16, 17, and series turn effected by conductors 19, 20 conduct the generated current in a series circuit to operate the dynamoelectric machine as a direct current linear electromagnetic generator. The series circuit also includes armature fluid in conduit 11 disposed between compensation conductors 16, 17 and within the magnetic field produced by the series turn effected by conductors 19, 20 so that the dynamoelectric machine operates as a direct current linear electromagnetic pump forcing fluid flow in conduit 11. Means varying the flow of fluid in the fluid flow system including conduit 10 varies the flow of fluid in the separate fluid flow system including conduit 11.

Figure 3:
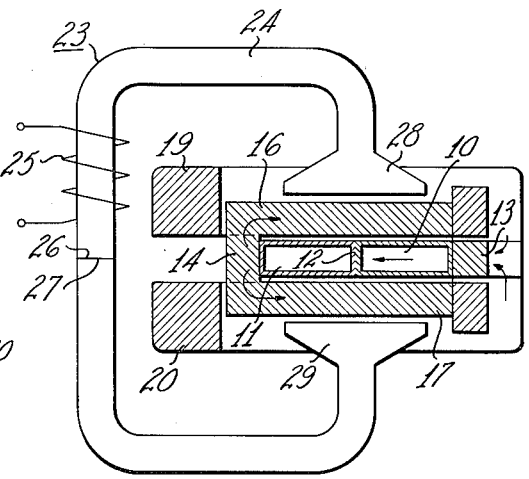
Fig. 3 is a cross sectional view taken along the line III—III of Fig. 2.
Figure 4:
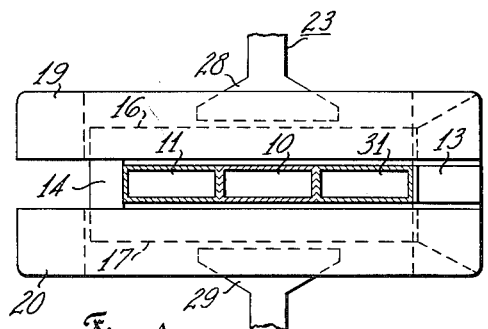
Fig. 4 is an end view of a modification of the machine shown in Fig. 1.

Fig. 4 shows the addition of a third conduit 31 to a machine like that shown in Figs. 1 to 3. Conduit 31 contains electrically conductive fluid serving as another liquid armature for the machine. Conduit 31 is disposed side by side with conduits 10 and 11 and connected electrically in series therewith between electrode conductors 13 and 14. Armature current generated in the fluid of conduit 10 is conducted by the fluid in conduit 31 and reacts with the magnetic field therein to force the fluid to flow in the direction of the fluid flow in conduit 11 and in the opposite direction of the fluid flow in conduit 10.

Figure 5:
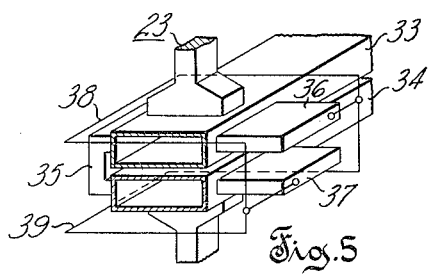
Fig. 5 is a view partly isometric and partly schematic of another direct current linear dynamoelectric machine embodying the present invention.

In the embodiment of the invention shown in Fig. 5, the dynamoelectric machine comprises two superposed conduits 33, 34 for containing electrically conductive fluid of separate fluid flow systems. Adjacent faces of the conduits are insulated from each other preferably by air space therebetween. Fluid in the conduits within a throat portion of the machine shown serves as liquid armatures connected electrically in series by an electrode conductor 35 secured to the left sides of conduits 33 and 34. An electrode conductor 36 is connected to the other or right side of conduit 33, and an electrode conductor 37 is connected to the other side of conduit 34.

A conductor 38 is connected across electrode conductors 36, 37 and is arranged in a loop above the superposed conduits forming a conductor turn about the armature portions of the conduits. Similarly, a conductor 39 is also connected across electrode conductors 36, 37 and arranged in a loop below the superposed conduits. Conductors 38, 39 effect a conductor turn about the armatures of the conduits.

Pole pieces of removable electromagnet 23 are also surrounded by the loops formed by conductors 38, 39.

In operation, fluid is forced in one direction through conduit 33, and this moving fluid cuts lines of flux therein to generate armature current which flows in series through the armature fluid in conduit 34 and through the parallel connected excitation loops formed by conductors 38, 39.

Armature current energizes the conductor turn to provide a magnetic field in series through the superposed conduits.

The current flows in one direction through the armature fluid of conduit 33 and in the opposite direction through the armature fluid in conduit 34. The opposite direction of current flow in these two superposed armatures compensate for armature reaction in one another so that additional compensating current conductors are not employed.

Current through the fluid in conduit 34 reacts with the flux therein to force the fluid in conduit 34 to flow in the same direction as the fluid in conduit 33. By means of the electromagnetic generator and pump, therefore, controlled fluid flow in conduit 33 causes controlled fluid flow in the same direction in conduit 34.

Figure 6:
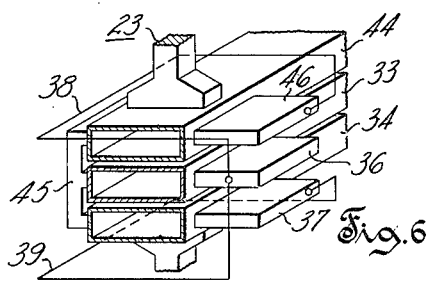
Fig. 6 is a view partly isometric and partly schematic of another direct current linear dynamoelectric machine embodying the present invention.

The embodiment of the invention shown in Fig. 6 is a modification of the arrangement shown in Fig. 5 in that three, instead of two, superposed conduits are employed. Additional conduit 44 contains electrically conductive fluid also serving as an armature for the machine and is connected in series with armature fluid of conduit 33 and in parallel with armature fluid of conduit 34. Electrode conductor 45 electrically joins one side of each conduit 44, 33, 34. Electrode conductor 46 secured to the opposite side of conduit 44 is connected through loop conductor 38 to electrode conductor 36 for conduit 33. Loop conductor 39 remains connected across electrode conductors 36, 37. Pole pieces of electromagnet 23 are surrounded by the loops which effect a conductor turn providing magnetic flux in series through the three superposed conduits.

Moving fluid in middle conduit 33 generates armature current which divides to flow in parallel paths through the armature fluid in the top and bottom conduits 44 and 34. The currents through the top and bottom conduits serve as compensating current for armature reaction in the middle armature, and similarly the current through the middle conduit serves as compensating current for armature reaction of the top and bottom armatures.

Armature current in the fluid of the top and bottom conduits react to force the fluid therein to flow in the same direction as the fluid flow in conduit 33. Thus flow of fluid in conduit 33 by means of the dynamoelectric machine forces fluid to flow in conduits 34, 44 of separate fluid flow systems.

Although but a few embodiments of the present invention have been shown and described, it will be apparent to one skilled in the art that various changes and modifications may be made therein without departing from the spirit of the invention or from the scope of the appended claims.

It is claimed and desired to secure by Letters Patent:

1. A multiple flow linear direct current dynamoelectric machine comprising a plurality of conduits each for containing electrically conductive fluid of separate fluid flow circuits, said fluid serving as armatures for said machine conducting armature current transversely of the fluid flow, a field conductor arranged to form a conductor turn adjacent said armatures, means forcing fluid through one of said conduits, and means applying a magnetic field through the moving fluid to cause armature current to be generated therein which flows through the fluid of another of said conduits and through the field conductor to produce a magnetic field through said armatures which reacts with said armature current in said other conduit to force said fluid to flow through said other conduit.

2. A multiple flow linear direct current dynamoelectric machine comprising a plurality of conduits each containing electrically conductive fluid in separate fluid flow circuits, said conduits disposed side by side with said fluid of said conduits serving as a common armature for said machine with the armature fluids of said conduits conducting armature current in the same direction through each of said conduits and transversely of the fluid flow therein, a compensating current conductor disposed adjacent the armature portion of said conduits, one end of said compensation conductor connected to one terminal of said armature, an excitation conductor arranged in a turn about said compensation conductor and connected between the other end of said compensation conductor and the other terminal of said armature to conduct said armature current in a closed series circuit through said armature, said compensation conductor and said excitation conductor, armature current in said excitation conductor producing a magnetic field through said armature transversely of said armature current and of said fluid flow, whereby fluid flowing through one of said conduits and means applying a magnetic field through the armature portion of said moving fluid to initiate generation of armature current therein, said armature current in another of said conduits reacting with said magnetic field to pump said fluid through said other conduit.

3. A multiple flow linear direct current dynamo-electric machine operable as an electromagnetic generator and as an electromagnetic pump comprising a plurality of conduits disposed side by side for connection in separate fluid flow circuits, said conduits containing electrically conductive fluid serving as a common armature for the generator and pump portions of said machine, a magnetic core having poles spaced apart by said armature to provide a magnetic field through said armature when said poles are excited, compensation conductors disposed within said magnetic field above and below said armature, said compensation conductors connected in parallel with each other and in series with said armature for conducting armature current in a direction through said magnetic field opposite its direction through said conduits, a field conductor divided to cross above and below said conduits adjacent both ends of said armature and wound about the adjacent said compensation conductors to form a conductor turn about said armature, said field conductor, said armature and said compensation conductors connected in a closed series circuit to effect a conductor turn about said poles to provide series excitation for producing a magnetic field through said armature, whereby fluid flowing through one of said conduits generates armature current therein which flows through said series circuit to cause electromagnetic pumping of the fluid through the other said conduit.

4. A multiple flow linear direct current dynamo-electric machine operable as an electromagnetic generator and as an electromagnetic pump comprising a plurality of conduits for connection in separate fluid flow circuits, said conduits containing electrically conductive fluid serving as a common armature for the generator and pump portions of said machine, compensation conductors disposed above and below said armature, a field conductor connected to said armature and divided to cross above and below said conduit adjacent both ends of said armature and wound about the adjacent said compensation conductors to form a conductor turn adjacent said armature, said field conductors, said armature and said compensation conductors connected in a closed series circuit effecting a conductor turn in the plane of symmetry of said armature with the axis of said turn normal to the direction of said armature current to produce a magnetic field through said armature, said compensation conductors disposed within said magnetic field and connected in parallel with each other and in series with said armature for conducting armature current in a direction through said magnetic field opposite its direction in said armature, whereby fluid flowing through one of said conduits causes armature current to be generated in the moving fluid which current flows through said series circuit to cause electromagnetic pumping of the fluid through another of said conduits.

5. A multiple flow linear direct current dynamo-electric machine comprising a plurality of conduits each containing electrically conductive fluid of separate fluid flow circuits, said conduits superposed with said fluid of said conduits serving as armatures for said machine conducting armature current in one direction through one of said conduits and in the opposite direction through another of said conduits transversely of the fluid flow therein, a field conductor forming a conductor turn about said armature, said field conductor connected in a closed series circuit with said armature, armature current in said field conductor producing a magnetic field through said superposed conduits transversely of said armature current and of said fluid flow, whereby fluid flowing through said one of said conduits and means applying a magnetic field through the moving fluid to initiate generation of armature current therein, said series circuit conducting armature current generated in said one conduit through said other conduit where said armature current reacts with said magnetic field to pump said fluid through said other conduit.

6. A dual flow linear direct current dynamoelectric machine operable as an electromagnetic generator and as an electromagnetic pump comprising two superposed conduits for connection in separate fluid flow circuits, said conduits containing electrically conductive fluid serving as superposed armatures for the generator and pump portions of said machine, a magnetic core having poles spaced apart by said superposed armatures to provide a magnetic field through said superposed armatures when said poles are excited, said armatures connected in series with one armature conducting current in one direction through one conduit and the other armature conducting current in the opposite direction through the other conduit to cause the current in one armature to compensate for the armature reaction of the current in the other armature and vice versa, a field conductor connected to said armatures and divided to cross above and below said conduits adjacent both ends of said armatures and forming a conductor turn about said poles, said field conductor and said armatures connected in a closed series circuit to effect a conductor turn about armatures and said poles for producing a magnetic field through said armatures, whereby fluid flowing through one of said conduits causing armature current to be generated therein which flows through said series circuit to cause electromagnetic pumping of the fluid through the said other conduit.

7. A multiple flow linear direct current dynamoelectric machine operable as an electromagnetic generator and as an electromagnetic pump comprising three superposed conduits for connection in separate fluid flow circuits, said conduits containing electrically conductive fluid serving as armatures for the generator and pump portions of said machine, the top and bottom said conduits serving as armatures for said pump portions of said machine and fluid in the intermediate said conduit serving as the armature for said generator portion of said machine, means connecting said pump armatures electrically in parallel with each other and in series with said generator armature for conducting current in a direction through said top and bottom conduits opposite its direction through said intermediate conduit to cause the current in the pump armatures to compensate for the armature reaction of the current in the generator armature and vice versa, a field conductor connected to said armatures and divided to cross above and below said superposed conduits adjacent both ends of said armatures and forming a conductor turn adjacent said armatures, said field conductor and said armatures connected in a closed series circuit to effect a conductor turn in the plane of symmetry of said intermediate conduit with the axis of said turn normal to the direction of said armature current for producing a magnetic field through said superposed armatures transversely of the fluid flow and of said current when said field conductor carries current, whereby fluid flowing in said intermediate conduit through said field causes current to be generated therein which flows through said series circuit to provide field excitation and cause electromagnetic pumping of the fluid through said top and bottom conduits.

8. A linear direct current electromagnetic device comprising a plurality of conduits for connection in separate fluid flow circuits containing electrically conductive fluid, said fluid in said conduits serving as armatures for said device, circuit means electrically connecting said armature fluids for conducting electric current through the fluid in each said conduit transversely of the fluid flow therein, said conduits disposed in a common magnetic field and means applying said magnetic field through the armature fluid of each said conduit transversely of the current and fluid flow therein, whereby fluid flow through one of said conduits generates current in said circuit means in the armature fluid thereof which current flows through the armature fluid of another of said conduits and reacts with said magnetic field therein to force said fluid to flow in said other conduit.

9. A linear direct current dynamoelectric machine comprising a plurality of conduits for connection in separate fluid flow circuits containing electrically conductive fluid, said fluid in said conduits serving as armatures for said machine, a field conductor arranged adjacent said armatures to form a conductor turn which when energized produces a magnetic field through said armature fluids transversely of the current and the flow therein, and means including armature current compensation electrically connecting the armature fluid of each said conduit to said field conductor, whereby fluid flow through one of said conduits generates current in the armature fluid thereof which current energizes said conductor turn to produce said magnetic field and whereby said generated current also flows through another of said conduits and reacts with said magnetic field therein to force said fluid to flow through said other conduit.

References Cited in the file of this patent

UNITED STATES PATENTS

| | | |
|---|---|---|
| 2,258,415 | Lago | Oct. 7, 1941 |
| 2,386,369 | Thompson | Oct. 9, 1945 |
| 2,612,109 | Wakefield | Sept. 30, 1952 |
| 2,637,207 | Boisblanc | May 5, 1953 |
| 2,669,873 | Gardner et al. | Feb. 23, 1954 |

FOREIGN PATENTS

| | | |
|---|---|---|
| 7,670 | Great Britain | of 1902 |

UNITED STATES PATENT OFFICE
CERTIFICATE OF CORRECTION

Patent No. 2,715,190 August 9, 1955

Edward F. Brill

It is hereby certified that error appears in the printed specification of the above numbered patent requiring correction and that the said Letters Patent should read as corrected below.

Column 8, line 13, after "flow" insert -- of fluid --.

Signed and sealed this 11th day of October 1955.

(SEAL)
Attest:
E. J. MURRY
Attesting Officer

ROBERT C. WATSON
Commissioner of Patents